United States Patent
Shaaban et al.

(10) Patent No.: US 10,796,383 B2
(45) Date of Patent: Oct. 6, 2020

(54) SYSTEM AND METHOD FOR ALLOCATING VALUE TO TIMEKEEPER WORK

(71) Applicants: Ahmed Farouk Shaaban, South Barrington, IL (US); Venkat Thandra, South Barrington, IL (US)

(72) Inventors: Ahmed Farouk Shaaban, South Barrington, IL (US); Venkat Thandra, South Barrington, IL (US)

( * ) Notice: Subject to any disclaimer, the term of this patent is extended or adjusted under 35 U.S.C. 154(b) by 673 days.

(21) Appl. No.: 14/756,685

(22) Filed: Jun. 29, 2015

(65) Prior Publication Data

US 2016/0110822 A1 Apr. 21, 2016

Related U.S. Application Data

(60) Provisional application No. 61/998,577, filed on Jun. 30, 2014.

(51) Int. Cl.
*G06Q 40/00* (2012.01)
*G06F 17/40* (2006.01)
*G09C 1/00* (2006.01)
*G06Q 30/04* (2012.01)

(52) U.S. Cl.
CPC ........... *G06Q 40/125* (2013.12); *G06F 17/40* (2013.01); *G06Q 30/04* (2013.01); *G09C 1/00* (2013.01)

(58) Field of Classification Search
CPC ........ G06Q 40/00; G06Q 30/00; G06Q 30/02; G06Q 10/00
USPC ............................ 705/30, 32, 7.29, 14.53, 34
See application file for complete search history.

(56) References Cited

U.S. PATENT DOCUMENTS

| | | | |
|---|---|---|---|
| 6,038,547 A | 3/2000 | Casto | |
| 6,052,671 A | 4/2000 | Crooks et al. | |
| 6,185,514 B1 | 2/2001 | Skinner et al. | |
| 6,747,679 B1 | 6/2004 | Finch, II et al. | |
| 6,832,176 B2 | 12/2004 | Hartigan et al. | |
| 7,343,316 B2 | 3/2008 | Goto et al. | |
| 8,209,243 B2 | 6/2012 | Smith et al. | |
| 8,838,486 B2 | 9/2014 | Kong et al. | |
| 9,020,848 B1 | 4/2015 | Ridge et al. | |
| 2001/0042032 A1* | 11/2001 | Crawshaw | G06Q 10/06 705/32 |

(Continued)

FOREIGN PATENT DOCUMENTS

| | | |
|---|---|---|
| EP | 1145162 | 7/2000 |
| EP | 1769452 | 2/2006 |

(Continued)

*Primary Examiner* — Olusegun Goyea
(74) *Attorney, Agent, or Firm* — Global IP Counselors, LLP

(57) ABSTRACT

The present invention consists of an improved partnership profit sharing system wherein hours billed and collected are tallied for a given time period, profits are determined, and then according to a predetermined set of rules, time billed and collected by each billing and client originating partner is assigned a ratio or factor by which the profit share will be divided among those eligible to share in the firm or company profits for the year. Positive leveraging factors include: time billed versus time collected, the rank of the total funds collected by a billing entity, the client's business ranking in terms of financial and business strength, placement on the Fortune 500 and the like.

20 Claims, 13 Drawing Sheets

(56) References Cited

U.S. PATENT DOCUMENTS

| | | | | |
|---|---|---|---|---|
| 2003/0120538 A1* | 6/2003 | Boerke | G06Q 10/0633 | 705/7.15 |
| 2003/0154122 A1* | 8/2003 | Jackson, Jr. | G06Q 10/06311 | 705/7.14 |
| 2007/0067206 A1* | 3/2007 | Haggerty | G06Q 40/00 | 705/7.34 |
| 2009/0006228 A1* | 1/2009 | Hodgin | G06Q 20/145 | 705/32 |
| 2011/0054968 A1* | 3/2011 | Galaviz | G06Q 10/06 | 705/7.28 |
| 2012/0173297 A1* | 7/2012 | Styn | G06Q 10/06311 | 705/7.15 |
| 2012/0233044 A1* | 9/2012 | Burger | G06Q 10/06 | 705/32 |
| 2012/0278211 A1* | 11/2012 | Loveland | G07C 1/10 | 705/32 |
| 2013/0086062 A1* | 4/2013 | Coyne | G06F 16/258 | 707/736 |
| 2013/0090968 A1* | 4/2013 | Borza | G06Q 10/06 | 705/7.16 |
| 2013/0290154 A1* | 10/2013 | Cherry | G07C 1/10 | 705/32 |
| 2014/0095539 A1* | 4/2014 | Smit | G06F 16/986 | 707/772 |
| 2014/0108644 A1* | 4/2014 | Zaents | H04L 67/02 | 709/224 |
| 2014/0201138 A1* | 7/2014 | Dorman | G06F 16/178 | 707/610 |
| 2014/0344122 A1 | 8/2014 | Hodgin | | |
| 2014/0258057 A1* | 9/2014 | Chen | G06Q 10/105 | 705/32 |
| 2015/0081381 A1* | 3/2015 | Okoba | G06Q 30/0255 | 705/7.29 |
| 2015/0081487 A1* | 3/2015 | Porter | G06Q 50/22 | 705/32 |

FOREIGN PATENT DOCUMENTS

| | | |
|---|---|---|
| EP | 2026222 | 2/2009 |
| EP | 2338293 | 4/2010 |
| WO | WO 2008/061146 | 5/2008 |
| WO | WO 2010/011652 | 1/2010 |
| WO | WO 2014/016796 | 1/2014 |
| WO | WO 2015/029073 | 3/2015 |
| WO | WO 2015/079776 | 4/2015 |

\* cited by examiner

| | Personnel Number | Profit Center | Matter Number | Activity Code | Worked Value | Worked Percentage | Normalized Value | Orig Allocated Value | Calculated New Value | Document Number |
|---|---|---|---|---|---|---|---|---|---|---|
| | 12345 | CHI1 | 10000849 | | 17,576.00 | 16.20 | 29,304.33 | 29,304.33 | | |
| | 45601 | CHI1 | 10000849 | | 5,670.00 | 5.23 | 9,460.60 | 9,460.60 | | |
| | 10789 | CHI1 | 10000849 | | 156.00 | 0.14 | 253.25 | 253.25 | | |
| | 24301 | CHI1 | 10000849 | | 62,814.00 | 57.91 | 104,753.94 | 104,753.94 | | |
| | 16442 | CHI1 | 10000849 | | 1,247.00 | 1.15 | 2,080.25 | 2,080.25 | | |
| | 74001 | CHI1 | 10000849 | | 12,865.00 | 11.86 | 21,453.67 | 21,453.67 | | |
| | 54276 | CHI1 | 10000849 | | 1,680.00 | 1.55 | 2,803.81 | 2,803.81 | | |
| | 54276 | CHI1 | 10000849 | | 6458.00 | 5.95 | 10,763.01 | 10,763.01 | | |

Normalization 28 30 32 34 36 38

| | Personnel Number | Profit Center | Matter Number | Activity Code | Worked Value | Worked Percentage | Normalized Value | Orig Allocated Value | Calculated New Value | Document Number |
|---|---|---|---|---|---|---|---|---|---|---|
| | 420 | SCL1 | 10000926 | BRG002 | 533,620.98 | 100.00 | 68,202.61 | 69,202.61 | 1000.00- | |
| | 74 | BKK3 | 10000926 | BRG003 | 192,691.76 | 100.00 | 25,086.47 | 24,086.47 | 1000.00- | |

| | Personnel Number | Profit Center | Matter Number | Activity Code | Worked Value | Worked Percentage | Normalized Value | Orig Allocated Value | Calculated New Value | Document Number |
|---|---|---|---|---|---|---|---|---|---|---|
| | 420 | SCL1 | 10000926 | BRG002 | 533,620.98 | 100.00 | 68,202.61 | 69,202.61 | 1000.00- | |
| | 74 | BKK3 | 10000926 | BRG003 | 192,691.76 | 100.00 | 25,086.47 | 24,086.47 | 1000.00- | |

Normalization 28) 30) 32) 35) 34) 36) 38) 40)

Figure 6

| | Personnel Number | Profit Center | Matter Number | Activity Code | Worked Value | Worked Percentage | Normalized Value | Orig Allocated Value | Calculated New Value | Document Number |
|---|---|---|---|---|---|---|---|---|---|---|
| | 420 | SCL1 | 10000926 | BRG002 | 533,620.98 | 100.00 | 68,202.61 | 69,202.61 | 1000.00- | 0100031290 |
| | 74 | BKK3 | 10000926 | BRG003 | 192,691.76 | 100.00 | 25,086.47 | 24,086.47 | 1000.00- | 0100031290 |

_18 Normalization

_20 Selection
Company Code: US11

Choose one
○ Group Bill Id
_22 ○ Matter   10000937

Period
_26 ☐ Life of a Matter
Fiscal Year: 2015
_25 Fiscal Period(from): 1    Fiscal Period(to): 8

Figure 9

| Personnel Number | Profit Center | Matter Number | Activity Code | Worked Value | Worked Percentage | Normalized Value | Orig Allocated Value | Calculated New Value | Document Number |
|---|---|---|---|---|---|---|---|---|---|
| 84 | GDL1 | 10000937 | | 5,360.00 | 4.12 | 740.66 | 640.66 | 100.00 | 0100031291 |
| 96 | JUZ4 | 10000937 | | 5,940.00 | 4.57 | 610.64 | 710.64 | 100.00- | 0100031291 |
| 232 | CHI1 | 10000937 | | 96,480.00 | 74.21 | 10,539.66 | 11,539.66 | 1000.00- | 0100031291 |
| 232 | PAO1 | 10000937 | | 13,200.00 | 10.15 | 2,578.33 | 1,578.33 | 1000.00 | 0100031291 |
| 282 | CUU1 | 10000937 | | 1,380.00 | 1.06 | 564.83 | 164.83 | 400.00 | 0100031291 |
| 493 | GDL1 | 10000937 | | 3,000.00 | 2.31 | 159.21 | 359.21 | 200.00- | 0100031291 |
| 713 | PAO1 | 10000937 | IPA5AG25 | 4,633.00 | 3.58 | 356.69 | 556.69 | 200.00- | 0100031291 |

| Document Edit Goto Extra Settings Environment System Help |
|---|

Display Document: Data Entry View —44

Display Currency  General Ledger View  50

Data Entry View
46 — Document Number: 0100031291  Company Code: US11  Fiscal Year: 2015  52
48 — Document Date: 05/08/2015  Posting Date: 05/08/2015  Period: 11
Reference: ___  Cross-Comp.No.: ___
Currency: USD   Texts Exist: ☐   Ledger Group: ___
                54       56                              58  60

| Cty | Itm | PK | S | Account | Description | Amount | Curr. | WBS Element | Profit Center | Tx | Functional Area | Ref. Key 1 |
|---|---|---|---|---|---|---|---|---|---|---|---|---|
| US | 1 | 40 | | 40000000000 | Allocated Fees | 100.00 | USD | 10000937-0000 | GDL1 | | | |
|  | 2 | 50 | | 40000000000 | Allocated Fees | 100.00- | USD | 10000937-0000 | JUZ4 | | | |
|  | 3 | 50 | | 40000000000 | Allocated Fees | 1000.00- | USD | 10000937-0000 | CHI1 | | | |
|  | 4 | 40 | | 40000000000 | Allocated Fees | 1000.00 | USD | 10000937-0000 | PAO1 | | | |
|  | 5 | 40 | | 40000000000 | Allocated Fees | 400.00 | USD | 10000937-0000 | CUU1 | | | |
|  | 6 | 50 | | 40000000000 | Allocated Fees | 200.00- | USD | 10000937-0000 | GDL1 | | | |
|  | 7 | 50 | | 40000000000 | Allocated Fees | 200.00- | USD | 10000937-0000 | PAO1 | | | |

Figure 13

SYSTEM AND METHOD FOR ALLOCATING VALUE TO TIMEKEEPER WORK

PRIORITY CLAIM

The present application herewith claims priority of Provisional App. No. 61/998,577, which was filed Jun. 30, 2014, and shall be considered as if fully set forth herein.

FIELD OF THE INVENTION

The present invention relates to the area of billing and collection with respect to timekeepers for professional firms and consulting companies, where it is important for profit sharing purposes to recognize the timekeepers who originate or directly control client relationships with the company, as well as those who are highly profitable billing entities.

BACKGROUND OF THE INVENTION

In the current marketplace, there are a variety of computerized time and billing systems for professional firms which are marketed under the following Trademarks: Timeslips by Sage, BillQuick, Clio and others. Some of these systems are computer based while others operate primarily in a cloud computing environment. These systems, however, are not suited to large law firms and professional firms having a global presence, with multiple offices in a plurality of countries which must be linked together for proper billing and financial management. In addition, these are basic programs which do not contain the most up to date features such as transmissions by text, email, fax, computer voice calling, and social media announcements and billing. Other numerous and varied disclosures related to billing and timekeeping are also disclosed in the prior art as shown below.

EP 1,145,162 issued to Ashby discloses the use of a System for processing credit applications, financial and insurance services and administrative and management tools. The System will generate a price quote for insurance and finance and facilitate on line credit application processing. It will further provide detailed reports for finance, insurance inventory, tracking and other administrative matters. It will provide quick quotes for a lease or loan. It will also perform: inventory tracking, insurance tracking, purchase tracking, applicant profiling, targeted marketing, customer satisfaction, etc. The system will collect data for credit, a description of the item being sold, insurance will be offered for the item, licensing and data required for the government will be collected.

Ashby also discloses that the User can be a financial institution, a dealer, manufacturer, insurer or supplier. It can utilize and store credit agreements with customer ratings and interest rates which can be bundled and sold on a public exchange. FAQ's can be provided in the system, and it can provide Quick Quotes on the spot to the consumer. However, this disclosure is directed to car sales and insurance, not timekeeping. The terms it stores are contract terms, contract ID, customer ID, buy rate, the sales rate, dealer markup, payments, cash down, trade in value, lease fee, monthly payments, commission and taxes due. However, Ashby does not relate to professional timekeeping or billing.

EP Patent No. 1,769,452 issued to Allin discloses the use of a computerized system for residential and commercial construction projects to maintain and disburse construction draws during construction. It can track lien waivers, and can prepare, approve, sign and distribute hundreds of checks to subcontractors each month. It also tracks construction change orders. It can manage all of the persons involved in each draw. It manages and generates a construction budget and time line. It also manages payments to material suppliers. It can manage and store the inspection data for each project. It can manage budgets for GC's as well as the subs. It handles ACH payments. Template forms are utilized to facilitate the draw process. Notices can be sent by email, text or voice.

EP Patent No. 2,026,222 issued to Alquier discloses the use of a system and method which allows the addition, modification and deletion of data base fields dynamically without the use of a data base administrator. The system allows the addition and modification of an informational structure dynamically distributed directly via the user interface. It supports different types of entity attributes including, text, numerical information, date ad time, predefined values and binary objects, allows the creation of relational dependancies between information entities (e.g., patent/child), provides flexible reporting capabilities including spreadsheets, slides, documents, timelines, etc.; it allows a configurable data entry interface; it allows importation of data from external sources; it allows full text searches; logs modifications for an audit trial (important for pharma and med devices); includes email notifications. It allows for a user interface that is flexible and configurable. The system uses template items, coding and tables to accomplish these purposes. However, it is not directed toward time tracking and billing generation.

U.S. Patent Disclosure No. 2003/0120538 filed by Boerke, et al. discloses the use of a method for tracking progress on a task by dividing the period of time into a plurality of timeslots and determining a target number of subtasks to be completed during each timeslot. For example, the time slots may be divided into 15 minute increments. The system only tracks the number of subtasks completed for each timeslot. The method also keeps track statistically of variances in subtasks completed between workers. The task may include any type of work. The process may be used for planning purposes, i.e., as a planning tool such that management can plan and process daily or monthly work shifts according to the work to be done for particular tasks and subtasks. This helps a supervisor spot and correct negative variances in worker performance. The progress can be logged into a computer or worksheet or in paper format. Problems are also noted by the method for correction to improve performance by variance cards.

U.S. Patent Disclosure No. 2013/00090968 filed by Borza, discloses the use of an employee management and scheduling method which is directed to ensure that adequate personnel are present as required and that statutory requirements are met and costs are tracked and minimized. The Borza disclosure is also directed at apps for management cell phone usage wherein managers can track employees, their shifts and their skills and managing same. This allows for real time changes by employees that are sick or have not shown up for work. The locations may also be tracked. Scheduling software is used to manage multiple employees at multiple locations. From one screen, a manager may create, edit and delete shifts and also have access to other aspects of managing the organization staffings with information about positions, teams, skills, etc. being provided. The System can print Shift Assignment Reports and Employee Reports. However, this disclosure is directed toward scheduling employees and not tracking their time or billing for their time.

U.S. Patent Disclosure No. 2012/0233044 filed by Burger, et al., discloses the use of a Method and System for labor project management and costing which may run on a cell phone app to monitor employee activity, identify faulty activity and manage allocation of labor resources. The app, as installed on an employee cellphone, allows the employee to travel to various job locations and record the activities at each job location. The employee may log into or out of the timeclock app installed on the employee's cellphone. The system can be used to monitor managers and administrators as well as employees. The system can be used to transmit payroll information. A flag may be generated if the worker travels outside the permissible areas allocated to his role. The system stores employee photos, job locations, routes, job codes, SIC codes, etc. may be entered into the back end by an administrator. The system also generates reports, and has a "Dashboard" or summary report simply show who is on the jobe, what time they arrived and GPS confirmation of location. The LPM platform may also be operated in the Cloud.

U.S. Patent Disclosure No. 2014/0258057 filed by Chen discloses the use of a system and method for tracking the User's time of a mobile device for the purpose of billing clients. The system is provided with a digital timer which is launched at the time of arrival and then stopped when the employee leaves. The system is directed at tracking time on a mobile device or app. It tracks time sending texts and emails. Time is recorded as soon as the professional receives a voice mail, phone call, text or email. The user can also input notes with the system's time recording and entry. The app automatically looks up in the user's contacts list whether the call or email or text coming in is from a client, and if so, it begins to track it for billing purposes. If not in the contacts registry, the user is alerted at the time and can add the contact as a client to be billed.

U.S. Patent Disclosure No. 2013/0290154 filed by Cherry, et al. discloses the use of the system and method to manage employees at a plurality of jobsites by providing a database wherein a set of job site data is stored therein. Employee devices may collect a set of time punch data and photos to store in the system. Management apps are used on supervisory devices to monitor the job site data and employees and validate photos and activate employee apps. This system is shown operating on a Cloud environment. The app will operate with a web browser, WiFi or on GPS authentication. The system essentially operates as a time tracking system for job sites. The system stores time photos of the employees at check in and check out. The system also records a job number, a job phase and a cost code. The system also has a payroll calculator communicating with a payroll service.

U.S. Patent Disclosure No. 2001/0042032 filed by Chrawshaw discloses the use of a system for capturing, processing and reporting time and expense data which can include flat fee billing, maximum fee billing and will also allow for discounts and write offs. It can be used for a wide range of businesses. A client will not have access to internal data of the company. The system will produce bills, expense reports, time sheets, proposals and project tracking. This appears to be a conventional program for law firm data which is run on a local server for one location. The system may produce various reports as needed. Bills may be delivered by email. The program will create envelopes for the bills. The system will also create budgets for the client.

U.S. Pat. No. 6,038,547 issued to Casto discloses the use of a construction tracking and payment system for use by contractors and subcontractors so that work may be tracked and payment may be timely made after the work is completed and inspections performed. The system complies with AIA requirements. The system may be implemented on a handheld computer. The system will break down a construction job into various elements, and then a contractor or subcontractor will be given a copy of how the site is partitioned, then each contractor or sub is responsible for submitting applications using the partitioning to ensure uniformity the architect desires to impose. The system can import and use CAD information on the job site. The system uses coding approved by the AIA.

U.S. Pat. No. 6,747,679 issued to Finch, II, et al. discloses the use of a time keeping and expense tracking server including a server that implements computer instructions that define logic for building GUI screens according to user instructions. The user can implement and design the screens needed for the tasks of time keeping and expense tracking. The system may be implemented on the Cloud or Internet with a laptop or wireless device desired. The GUI screen may be customized on a copany by company basis, a department by department basis, etc. The system also includes security wherein projects and project codes are only viewable by certain level employees.

U.S. Pat. No. 7,343,316 issued to Goto, et al. discloses the use of a network based shift scheduling system for generating temporary shift workers. It is sent over portable terminals over a network. The system is set to secure and provide work for a plurality of workers. Workers can also submit cancellations or shift changes via the system. The system also accommodates email for communication purposes. The system may also recruit new employees. The system stores the name, age, sex address, mail address and qualifications of the employee, the workable time slots, the type of job, hourly wage, etc.

WPO 2014/016796 filed by Gupta, et al. discloses the use of a system and method for employee tracking in a mobile communication device wherein dynamic location reports may be generated in real time or near real time. The system is directed to door to door delivery or pickup sales forces. The System uses a mobile app on the employees cellphone to conduct the tracking of the employee. The system will raise flags if deviations from tracking occur. The system uses Blue Dophil software to analyze where employees should be performing tasks and produces flags when parameters gathered fall outside permissible ranges. These flags are sent to management via text or email.

U.S. Pat. No. 6,832,176 issued to Hartigan, et al. discloses the use of a method and system for tracking and reporting time spent on tasks in different application on the end users' computers while the tasks are bing performed. It may track the opening and closing of files automatically and send reports and messages directly to and from other applications. The software may also suggest categories for each task based upon at least one criteria. The system may use MS Outlook for assistance in tracking tasks and transmitting reports. It is directed toward attorneys and accountants. The system may track fixed fees and use data collected for evaluating production or sweat equity bonuses to employees. The system may track a plurality of projects or research endeavors. It can track the time spent by accountants on spreadsheets. It can track the time engineers spend on designing computer code or simulating circuit designs, etc. It mentions the use of Timeslips for professional time tracking and TABS II for tracking other professional time spent on tasks and projects. The system tracks time on computers used by the professionals involved. The system presents toolbars to assist in tracking time. The system will track time spent in applications such as MS Word, Excel, Outlook, Power Point, etc. It will track when the application is open, active and then closed. It can score and rate the usage of these various types of software automatically. Various reports may be generated by the system for management usage on a periodic basis, as desired.

WPO Patent Disclosure No. 2015/079776 to Hishiki discloses the use of a work state management system that manages clock in times for drivers of vehicles that work overnight shifts and calculates the appropriate breaks for the driver so that the driver is not over tired.

U.S. Patent Disclosure No. 2014/0344,122 filed by Hodgin, discloses the use for billing for time spent in an IM session by a service person wherein the system can automatically bill a project/client by searching for the name of the client or project within a text or instant message or a series or session of same. If the system cannot find the name of a client or project, then the user will associate the IM session with a new project or client so that the client may be billed for the IM session with the client. Or the System may default into a common template for the User's typical instant messaging sessions.

U.S. Patent Disclosure No. 2009/0006228 filed by Hodgin discloses the use of a time tracking system and method similar to the IM system noted above by Hodgin. The Hodgin system will also store a list of prior associations to Projects and Clients that are built on the same or similar words and phrases.

U.S. Patent Disclosure No. 2002/0154122 filed by Jackson, Jr. discloses the use of an improved system for employers, referral agencies, consultants and independent contractors to hire and manage employees and provide tax reports and wage reports. The Jackson, Jr. System may track and manage employees, salaries and experience to provide optimal benefits to the employer. The System produces computerized scheduling, billing, record keeping and payment templates. It provides a listing of invoices for the User to refer to. It consists of providing invoices for contractor services and performs its functions in a cloud based system.

U.S. Pat. No. 8,838,486 issued to Kong, et al., discloses the use of a time manager interface on a communications display device which allows a worker to keep track of her or his time and activities. The time manager keeps track of time spent logging into and out of the system. This was important in years past when boot time were quite long. It discloses the use of scanning in employee badges to track work time. This disclosure is directed toward a system for checking work in and work out time. In one version of an embodiment, the System is located in the field. It discloses the use of GPS in the field to create an audit trail of time worked. Biometric information may be used for the system to identify the worker. It can be used nationwide for multiple local offices. It may be coupled to communicate with employee hand held devices. It can work over WiFi and cellular networks. It can store: DOB, SSN and other employee details. It can be used with a barcode or QR code. It can be used in connection with microphones, cameras and scanners. For remote sites, the system can check the IP address of the computer or hand held device to ensure security in the system. The system can also be used to check work schedules to lock an employee out of the system when not scheduled. When an employee arrives at a worksite, upon verification, one or more emails or text messages may be sent to management for that site. Employees may view the work schedules of other employees if granted permission to do so. In doing so, employees can request work dates and exchange them with others. The system can differentiate between exempt and non exempt employees. The system can display messages to employees during time in and time out registration.

U.S. Patent Disclosure No. 2012/0278211 filed by Loveland discloses a system for remotely tracking and monitoring Worker's activities via mobile phones or other mobile tracking devices. This system monitors continuously whether or not a worker is present at a worksite.

WPO 2010/11652 filed by Manser discloses a System and Method for tracking employee performance. The Manser system provides a user interface to allow the user to assess the balance of hard skills and soft skills of an employee, evaluate the employee's performance in a plurality of categories and compare the average cost for the job in the marketplace to the cost of the employee being evaluated. The system also analyzes the average cost of a similar job in the relevant marketplace during employee reviews. The program continually monitors the value of an employee to the employer to determine ROI at any given time. The system can be applied to direct hires, contractors, temps or any employee relationship. The system allows the identification of both over achievers and under achievers. The system provides a means by which employees may determine how to get the highest ratings via their work efforts.

EP 2338293 filed by Molotsi discloses a system for time tracking for employers on a mobile computing device. The system involves providing an event manager on a mobile computing device for managing a plurality of events which are then synchronized to a server. The system will automatically track time and estimate time spent on a task by the worker. This system logs events in the user's calendar, in emails and texts. Timestamps for events and mapping for the events are provided. A client list and data may be provided in one or more files or databases. The system may communicate with a worker's smartphone. The user may be able to open, edit, delete, review or manage all automatically created event records. The system may use information in the text, email, and calendar to automatically create a time tracking record for the user. In addition, the system may automatically convert emails, texts, meetings on a calendar to a time tracking event by means of a pop up box to the user.

WPO 2008/061146 filed by Neveu Holdings, LLC discloses a system and method for remote time collection for employee time on job sites. The system can collect an employee's name, picture, title, contact information, health and/or safety information, skill information, etc. The system can also collect for each employee a project name, project identification, location, project start date, project supervisor and detailed comments about project activity. The system can also collect information on vendors, such as name, address, phone, contacts and type of vendor. The system can also use GPS information and compare it with when the employee is supposed to work. The system collects biometric information to identify an employee. In one embodiment, a time collection database is configured to receive, process and store information related to projects such as name, identification, location start date, supervisor, etc; vendor's name, address, number contact, subcontractor type, etc. project supervisors, tasks, employee titles, departments and employee time records. Office data collection may include: job site, task and project information via a wireless connection. Encryption is used to transmit data to and from the remote site. The system may also include a field scheduling module to schedule a job for a particular jobsite and for a specific remote user(s). The user can edit hours and view comments from remote workers. Remote monitoring can record task completion, view management comments and ask for management assistance and crew responsibilities.

U.S. Patent Disclosure No. 2015/0081381 filed by Okoba discloses a system and method for recording time which may be used on a device, software or application. It may be used by logging into a plugin or extension. The time recorded may be exchanged for vouchers which may be redeemed or traded with other members. A user will register with an ID and password to log into the system. The system may record device activity, software activity, application activity, keyboard activity and mouse activity. The user's time spent in the browser or on a video game may be given a redeemable value. A database may store the recorded activity for further analysis. The system will work on computers, tablets, cell phones, television, games, digital books, exercise apparatus, web browsers, mobile apps and video games. Vouchers may represent monetary value, promotions, products or services. User name and password may be stored in system cookies. The system can capture video game or browser activities, keyboard or mobile keyboard activities. The activity spent in the system may translate to purchasing power so that the user may receive optimized value from their activities and the system may deliver purchasing incentives at the right time and place and for the right product or service. A business may be selected as a favorite from user activity on the system.

U.S. Patent Disclosure No. 2015/0081487 filed by Porter, et al., discloses the use of a time tracking and productivity system including a tracking component to locate an employee to record time spent at various locations. This system is designed to monitor and improve coordination of patient care, and in particular, to limit the number of patient hours a resident physician can work per week. When the rules implemented by the ACGME are violated, strict fines and probations or suspension may be implemented. This system is primarily concerned with tracking an employee's location and work hours. This system can include cloud performance. It is the movement of an employee within predetermined boundaries that will trigger the recording of a new event. It can track time in a patient's room, a brake area, doing paperwork, etc. A GUI is used on handheld devices. The system can also use tags that interact with RF signals. The system records employee info and FRIDA numbers, the resident program director, the resident coordinator, start and end times for resident shifts, house calls, hospital room calls, night float, etc. If moonlighting is permitted, the system can track moonlighting hours as well. It will store vacation schedules and rotation schedules. The shift log can include a short trip buffer. Automatic warnings of over limit hours are sent to management for the residents via text, phone, email, etc.

U.S. Pat. No. 6,185,514 issued to Skinner discloses a method and system for automatically collecting and analyzing information regarding time and work performed on a computer. It uses a data collector for monitoring certain portions of a worker's computer activity and an analyzer for showing which portions of the activity were continuous work activities, and the system will categorize the work into preset projects and tasks within a project. The information is periodically written to data storage. The system is directed toward telecommuters. The system automatically excludes time where there was no activity on a computer. The system is used to forecast future projects with reduced financial risk. The system includes the automatic documentation of time. The data stored on the system is encrypted so that it cannot be altered by the user. The data collector automatically collects the activity on a mouse and on the keyboard of the computer user. The system creates a log file of work activity. A hardware abstraction layer can interface with phones and other devices and can be used with pointing devices such as a tabled or mouse. The system keeps track of activities within open multiple windows on a computer.

U.S. Pat. No. 8,209,243 issued to Smith, et al., discloses the use of a system for performing real time labor management and timesheet reporting which is adapted to wirelessly transmit timesheet information. The portable devices may be dedicated to tracking time only and cannot perform other computing functions. The system includes a portable electronic punch system that is capable of communicating with the labor management system via text. The system allows user to manage work schedules and report timesheet information without requiring an internet accessible computer. The units send timesheet information directly back to the server for analysis via wireless network. The text messages may contain: employee ID, clock in time, clock out time, break times, days worked, days off and other work related information. New user information may be set up by text message into the timekeeping system. The system may operate over any wireless system, i.e., GSM, GPRS, CDCP, Bluetooth, Wifi, etc.

U.S. Pat. No. 9,020,848 issued to Ridge, et al., discloses the use of a method for tracking time and location of an employee according to a predefined schedule and it may utilize software to track the presence or non presence of: a NFC (near field communication), BLE (Bluetooth Low Energy) or other wireless device. The system will track the presence of an employee in a geofenced area. It will also track employee time and other data to log that into a payroll system. The low energy device then communicates data to a server if a signal could or could not be detected. It will also allow for manual clocking in and out in case of failure of the back end server. The system can also be used for security purposes. The system can function in real time or in batch request mode. The information may be a time stamp, a status or location of a mobile device. In one embodiment, the system can be used for employees for a retail store or restaurant. The system can utilize Bluetooth tapping to log in. It may be used at a trade fair both by tapping the device to a NFC communicator. It may be used in connection with a mobile time clock app. It can be used to advise management when non authorized employees enter a restricted work zone. Management may input which work zones are restricted and which are not.

WPO Disclosure 2015/029073 file by Shirish discloses a system and method to measure aggregate and analyze time, effort and productivity by reviewing time spent on activities such as calls, travel, lab work, meetings, discussions and remote visits. PD's or Presence Devices may be used to track employee location. The system can track average daily work patterns. It can track work activities and private activities. It can track emails and browsing. It can account for flexible work hours, use of multiple and different types of computing environments (PC at work and home, smartphones, tablets, etc.) It can capture files, folders, web links, etc. It can make all personal endeavors password protected and private. It is intended to track effort and performance 24/7. It can provide modules that promote work focus and minimize distraction by awarding performance points, badges for consistent performance and progress in performance goals. It can measure improvement by creating an n-dimensional effort data cube and include analytics for custom reports. The system can go into self improvement mode to set goals for self improvement and activities related thereto. It can be used at work whenever and where ever. It has a time tracker for all online time. It has a Merger to merge offline and online time effort mapping. It has an interference engine to determine Work Patterns for employees, leave taken, work done on holidays, desk or supervisory or travel oriented job, etc. The System will also present organization goals and analytics, top performers, work patterns, recent deviations from work patterns. A Collector module measures data to improve the exact work effort at the individual level throughout the day. The System can be used on SAS (Software as a Service) and it may be hosted in a cloud-computing environment.

U.S. Pat. No. 2012/0173297 A1 disclosed by Styn, et al., a method and system for task tracking and allocation is disclosed. The disclosure provides for a method in which an individual may create a set of instructions operable to perform a set of tasks in a computer readable medium. That set of tasks may comprise maintaining a database, generating a first interface displaying subjects associated with individual issues, and a second interface with notes specific to an issue selected by a user. The instructions stored in the database may be implemented accordingly and the computer may maintain a plurality of relationship records containing data indicating relationships across folders. The disclosure also mentions the prior use of MS Project and ERP systems that employ Gantt charts, milestones and tasks and subtasks with complex dependencies. This system keeps track of billable items. However, Van Styn is not a true timekeeping and professional billing system.

US Pat. No. 2014/0108644 A1 disclosed by Zaents, et al., a method and system for tracking time in a web-based environment is disclosed. The method of tracking time involves a web-based application to track time associated with several records. Identifying a record in an active state, generating a record associated with the active record and activating a timer, and having the ability to end the session in response to an indication that the record is an inactive state. The time-tracker may be hosted in a cloud-computing environment. The time-tracker may calculate the entire duration of the record by continuously adding the active times together. The method may detect a predetermined total duration of time has been exceeded and provide such indication to user. This disclosure mentions timekeeping, billing and using a web browser and multiple tabs to record time for multiple clients when a professional is switching back and forth between projects. It is useful for billing, accounting and auditing. More than one user can log into the system on a computer and track time her or his time on the same computer. It also teaches the use of sub-tabs to track time. A stop watch type button is used to switch on and off the time tracking, or time is tracked as the user switches browser windows.

However, none of the above patent disclosures teach or suggest improved billing and timekeeping systems which are able to directly edit work-in-progress sheets, draft and final bills and automatically have those changes reflected in the original work data entries. There are also no timekeeping and billing systems seen in the marketplace that can automatically predict cash flow, partner profits and allow clients to view bills in real time. These and other additional objects and advantages are readily derived from the disclosures and drawings provided herein.

SUMMARY OF THE INVENTION

The present invention consists of an improved system and method for billing and collections for allocating value of time and work billed by timekeepers according to weighted values assigned to their work which were created according to a predetermined set of rules. Allocation is the proportional allocation of collections to the Timekeepers based upon the billed (and collected) value of their work. The allocation can be done at the invoice level, matter level and matter group level. The present inventive system and method is used to allocate billings and collections proportionately to all Timekeepers who have recorded Time over a specified period according to the value of the client, profitability of the work and client, etc.

Normalization is the proportional allocation of the collections (funds collected) and billings (total billed value) to the Timekeeper based upon the Timekeeper's worked value. Normalization can be done at the Matter level, Matter group level and also for a set of Matters together as grouped by the User thereof. Normalization can be done for a single fiscal period, multiple fiscal periods, and also for the life of any Matter billed.

At most professional firms, there are Timekeepers who bring clients into the firm, and therefore their hours are more valuable than those that do not. Further, some clients always pay on time and 100% of the bill, while others may take an average of 60 or more days to pay, and then they want to have discounts of up to 25% or more. Those are not very valuable clients. Other clients do not cooperate in litigation, do not show up to meetings when asked, their depositions have to be often rescheduled, they do not produce documents when asked, and all of these types of behaviors can contribute significantly to the risk a law firm undertakes when representing such a client.

By implementing a system of profitability for partners of the firm based upon client promptness in payment and profitability, the firm can encourage all its employees to tend to work on those clients that pay 100% of their bill in a timely manner for the most profitable of matters. It will discourage working on clients that take a long time to pay (e.g. 90 days or more), and it can also discourage working on difficult clients that are likely to be sanctioned in court, or are likely to sue for malpractice.

At the basis of the system, for a given period, typically the first of the year to the last day of the year, the number of hours billed and collected is divided by the total time spent on a particular client. In such a manner, clients are easily rated according to their base profitability.

Some clients do not pay at all, while others are prone to filing groundless bar complaints. Other clients ask for and pay for flat fee work. While it is a problem that they ask to limit their billing, nonetheless, a prompt paying flat fee client is often of great value to a firm, especially when the economy is slow or marginal. Some types of law may be more advantageous to the firm than others and the leveraging or ranking system may reflect that. Some firms prefer intellectual property work, business litigation, commercial real estate closings, etc. and they may weigh them 1.2, 1.5 or more times preferable over other types of work. Accordingly, some industries may be preferable for some firms over others. This type of ranking can be easily accomplished with SICs or Standard Industrial Codes which are assigned to the client during client intake and can be used to weight the Time entered and collected by Timekeepers and Client Originating and Billing Partners.

In one preferred embodiment of the present invention, the Timekeeper Leverage Ratio may be automatically calculated by the system by merely keeping track of certain facts regarding each client. For example a client, can be rated on a 10 point system, with 10 being the highest rating a client may have. Clients rated a 10 will have twice the value of the average client rated a five which is average and for which 50% of the firms clients will either be above or below.

Clients rated a 10 will have double the value over other clients who are average or normal in their behaviors and payments. Timekeepers that generate above average profitability in large volumes of highly profitable work, will be given the highest values for determining their leverage and share of the firm's profits at year's end. Conversely, Timekeepers that have clients who pay late, or do not pay at all, or who constantly cut the bills, will have low client ratings and will poorly share in the firm's profits at years end.

varying write offs and flat fee arrangements. For the purposes of this exercise, a write off is treated the same as a flat fee which is less than the number of hours worked times the set hourly rate for a given Timekeeper. In addition, the client is given 30 days to pay. A client is deemed as an "early pay" if it pays either in advance, or within 10 days of presentment of the bill. A client on a signed payment plan is not considered late as long as the payment is timely made and it includes the interest agreed upon by the firm.

| Partner | Hrs collected/ Hrs billed | days late * amt late | total collections | demerits value | points | profit share |
|---------|---------------------------|----------------------|-------------------|----------------|--------|--------------|
| A | .95 | 10 | 300,000 | 1-$10,000 | 14 | 36842 |
| B | .85 | 30 | 225.000 | 3 | 9 | 23684 |
| C | .70 | 45 | 175,000 | 2 | 7 | 18421 |
| D | .5 | 60 | $150,000 | 1 | 5 | 13158 |
| E | .5 | 70 | $ 150.000 | 0 | 3 | 7894.7 |
| value to firm | 1 | 1.2 | 1.5 | .5 | 38 | 100000 |

In the past, the determination of profit sharing often was done by unfounded beliefs, assertions and political power, which does very little to ensure fairness and create a system to increase profitability at a given firm. Of course, the firm can add in more subjective criteria to the present analysis scheme, such as cooperation from the client, whether the client attends court sessions, firm meetings, timely produces documents, signs court papers, including affidavits and declarations, etc. Clients that do not timely cooperate with counsel or staff may be given a lower leverage rating when profits are divided.

In addition, law firms desire to have their staff be productive, without over billing, bill churning, or failing to take any time for vacation or to relax. It is generally considered optimal for attorneys to bill from 1800 to 2200 hours per year, but not above that. In such a manner, attorneys whose time falls in an acceptable range of optimal billing hours may have that reflected in their overall leveraging factor or ratio.

Typically, at the end of a given year, there is a pot of profits to be divided among billing and client originating partners. Non equity Timekeepers do not share in the profits, but their profitability instead is assigned to a partner who is either the billing partner (partner in charge of the associate and account) or to the client originating partner. Some clients come to the firm not by means of any partner. These will have billing partners in charge. Others bring clients with them, or bring them to the firm and keep and maintain these relationships and are client originating partners. Either way, the billing partner and client originating partners will take a share of profits from other attorneys at the firm that do work for these clients. Sometimes an attorney will leave the firm, but the client will remain, and that client will then become a firm client and one or more attorneys will become the billing partner for that client and share in those profits.

Example 1

Partners A to E will split up $100,000 in profits at years end. If they did this equally, each partner will end up with $20,000 in profits. However, in this case, Partner A produced half the profits, partner B produced 25% of the profits, partner C produced 15%, and D and E produced just 5% each. In addition, partner B and C's client paid late about half the time. Each of the partners worked different amounts during the year, and some cut bills and provided clients with In the above scenario, the partners are ranked on each criteria from 1 to 5, because there are 5 partners. For partner A, he is the first or gets 5 points for his hours collected vs. billed, he is the first or gets 5 point for the number of days late his client payments were, he gets 5 points for being first in total collections, however, one client cost the firm $10,000 in sanctions, so he gets one demerit, as judged by the other partners.

Similarly, Partner B is second, or gets 4 points for his ration of hours collected vs. hours billed, his late payments average 30 days and he is second best in late payments so he gets 4 points. His total collections are second for the firm so he garners 4 points there. But his demerit points are 4. He had two client no shows at a "must appear" in court, and two client no shows for depositions. This adversely affects the firm. So he gets 3 demerits for these problems.

Next is Partner C, being third in hours collected vs. hours billed. He is given 3 points for his ratio of hours collected. The number of late payment days average 45. The number of collections are third from the top. But he only had 2 demerits for his client's failure to timely answer discovery, and for one client failing to appear in court for a must appear. His point total is 7.

Further shown in Example 1 above is Partner D, being fourth in hours collected vs. hours billed and he is given 2 points for his ratio of hours collected versus hours billed. His number of late payment days averaged 60. His total collections were $4^{th}$, even with Partner E.

Last is Partner E in Example 1 above. He came in $5^{th}$ on billed hours to the total collected, so he gets only 1 point for that criteria. His late payments averaged 70 days late, so again he is awarded only 1 point for that criteria and he is also last in collected hours, so he receives 1 point for that activity.

Next the Chart for Example 1 shows how the points are totaled for each partner, and the demerits are subtracted for a total of 38 points. Next the partner is awarded his points divided by 38 and that percentage is multiplied by the total profits available to be split. This percentage is the Billing Entity Factor for Profit Sharing.

The points values may be further manipulated by the desirability of the clients for each partner. For example, if a partner has a fortune 100 company for a client and at least $200,000 in billings, his points may be further leveraged by an additional point multiplier, such as 1.5 for those client hours.

Or, a client may have a client with a poor credit rating, and a multiplier of 0.8 may be assessed against that partner's leverage and then the points totaled.

Example 2

| Partner | total collections | Client Leverage | Total * Levrge | Partner % | profit share |
|---|---|---|---|---|---|
| A | $300,000.00 | 1.5 | $ 675,000.00 | 48.17% | $ 48,171.28 |
| B | $225,000.00 | 1.25 | $ 281,250.00 | 20.07% | $ 20,071.36 |
| C | $175,000.00 | 1.0 | $ 175,000.00 | 12.49% | $ 12,488.85 |
| D | $150,000.00 | 1.0 | $ 150,000.00 | 12.49% | $ 12,488.85 |
| E | $ 150.00 | .8 | $ 120,000.00 | 8.56% | $ 8,563.78 |
| value to firm | $850,150.00 | | $1,401,250.00 | 101.78% | $101,784.12 |

In Example 2, the partners A to E have been ranked according to their total collections, which was $850,150 and their clients have been ranked according to various criteria found on the internet, including, but not limited to: Better Business Bureau rating, Google Business, Yelp, and the like. In addition, the Partner's AVVO or other lawyer ranking was considered in assessing a Client Leverage. This is but one Billing Entity Factor to use in divvying up the firm's profits. There are various ways in which to leverage profits, however the most common criteria used in law firms are 1) the strength of the client, whether the client is a fortune 100, fortune 500, and then a client may be ranked by total income for the year and/or total employees. Likewise, the company or firm may find some industries to be more profitable than others. At the time of intake, the System will be provided with the SIC or Standard Industrial Code for the new Client, and the firm can then rank individual or groups of SIC's to encourage its billing entities to seek out and retain businesses in those types of industries because they are more profitable to the firm. Similarly, this can also be done with the Activity or Area of Law for the new or existing Client or Matter undertake. Activities include: litigation, transactional work, document creation, general advice, and the like. Areas of Law may include: intellectual property, litigation, family law, probate, international treaty law, and the like.

By using an automated system to determine leverage points, as shown above, the profitability split for the year may become more predictable, and therefore there will be less discontent at the end of the year among billing and client originating partners.

Normalization or leveraging billed and collected hours should not affect flat fees or other arrangements provided to clients. This is because flat fees are typically repetitive work that a firm is well adept at so that routing or repetitive tasks can be done quicker and more efficiently such that there should be little to no difference on the bottom line to a firm.

In one preferred embodiment, the allocation basis for Normalization or Leveraging Time is the Timekeeper's worked value divided by the total worked value for a specific time period. For Flat Fees, Normalization does not calculate worked amount over a specified period, but uses worked amount against the value of the Flat Fee code. The present invention also allows the user to reverse normalization and reset the client to actual hours billed and collected.

Many online systems also rank the credit strength of a particular business entity. In such a situation, the present invention can ping these websites, retrieve information regarding the stability of a business and use that criteria in the normalization or leveraging of a business. For example, the present inventive system can ping Fortune Magazine to determine if the business is ranked in the top 500 businesses and a value can be assigned to leverage based upon that ranking. Further, the present inventive systems can ping Google and Yelp and rate businesses based upon those consumer ratings. If consumers vote a business low, it may have problems with sales or attracting new customers based on those ratings. Likewise, the present inventive system may ping the Better Business Bureau for its ratings of the client.

In such a manner, the present invention utilizes a wide variety of information in order to provide flexibility to a professional firm to encourage its partners to seek out, recruit and maintain the highest quality businesses that are stable and most likely to pay the bill quickly in full each billing cycle.

While the above invention has been described in a variety of preferred embodiments, additional variations and features which are obvious to try or common in the relevant art should be considered to be included within the scope of the present invention, as if set forth fully herein. For example, in Swiss Verein business associations, the present inventions is well adapted to provide profit and profitability information to the Partners and Managing Partners in real time. It also works well with other types of business structures and partnerships, joint ventures, LLC's and PC's.

Objects of the Invention

Thus, it is one primary object of the present invention to provide an improved System and Method for normalizing or leveraging the value of Time billed for Timekeepers for the purpose of profit sharing at the end of each fiscal year which utilizes as a factor, the number of billed and collected hours by each timekeeper that are then assigned to a client originating partner.

It is further one primary object of the present invention to provide an improved System and Method for normalizing or leveraging the value of Time billed for Timekeepers for the purpose of profit sharing at the end of each fiscal year which utilizes as a factor, the promptness of payment by a client.

It is yet an additional primary object of the present invention to provide an improved System and Method for normalizing or leveraging the value of Time billed for Timekeepers for the purpose of profit sharing at the end of each fiscal year which utilizes as a factor, the position of the client on a Fortune 100 or 500 list and a value is assigned thereto.

It is further an additional primary object of the present invention to provide an improved System and Method for normalizing or leveraging the value of Time billed for Timekeepers for the purpose of profit sharing at the end of each fiscal year which utilizes as a factor the rating of the client's business by one or more of the following publications: Better Business Bureau, Google Business and Yelp.

It is still an additional primary object of the present invention to provide an improved System and Method for normalizing or leveraging the value of Time billed for Timekeepers for the purpose of profit sharing at the end of each fiscal year which utilizes as a factor a point system which gives demerits or decreases the value of the Time worked accredited to a client originating partner when the client becomes late in payments, and this decrease in value may begin at 30 days late on average, 60 days late on average, 120 days late, etc.

It is further a primary object of the present invention to provide an improved System and Method for normalizing or leveraging the value of Time billed for Timekeepers for the purpose of profit sharing at the end of each fiscal year which utilizes as a factor the relative ranking of a client originating partner for one or more of the following attributes: hours collected versus hours billed; the average days late a client is in paying the bill in full; the total amount of funds collected for that client originating partner, etc.

It is yet an additional primary object of the present invention to provide an improved System and Method for normalizing or leveraging the value of Time billed for Timekeepers for the purpose of profit sharing at the end of each fiscal year which utilizes as a factor a ration assigned the partner based upon the value and quality of clients.

The present invention, while directed to Firms and Companies, is easily adapted to be used by a wide variety of business types, including, but not limited to: corporations, business ventures, partnerships, organizations, NFP's (not for profits), LLC's, PC's, Swiss Vereins, GmbH and all other types of methods for organizing businesses.

These and other objects and advantages of the present invention can be readily derived from the following detailed description of the drawings taken in conjunction with the accompanying drawings present herein and should be considered as within the overall scope of the invention.

BRIEF DESCRIPTION OF THE DRAWINGS

FIG. 1 is a screen shot of the present invention, Improved Client Normalization and Ranking System for Profit Sharing.

FIG. 2 is a is a screen shot of the present invention, Improved Client Normalization and Ranking System for Profit Sharing.

FIG. 3 is a is a screen shot of the present invention, Improved Client Normalization and Ranking System for Profit Sharing.

FIG. 4 is a is a screen shot of the present invention, Improved Client Normalization and Ranking System for Profit Sharing.

FIG. 5 is a is a screen shot of the present invention, Improved Client Normalization and Ranking System for Profit Sharing.

FIG. 6 is a is a screen shot of the present invention, Improved Client Normalization and Ranking System for Profit Sharing.

FIG. 7 is a screen shot of the present invention, Improved Client Normalization and Ranking System for Profit Sharing.

FIG. 8 is a screen shot of the present invention, Improved Client Normalization and Ranking System for Profit Sharing.

FIG. 9 is a screen shot of the present invention, Improved Client Normalization and Ranking System for Profit Sharing.

FIG. 12 is a screen shot of the present invention, Improved Client Normalization and Ranking System for Profit Sharing.

FIG. 13 is a screen shot of the present invention, Improved Client Normalization and Ranking System for Profit Sharing.

DETAILED DESCRIPTION OF THE DRAWINGS

Figure 1:
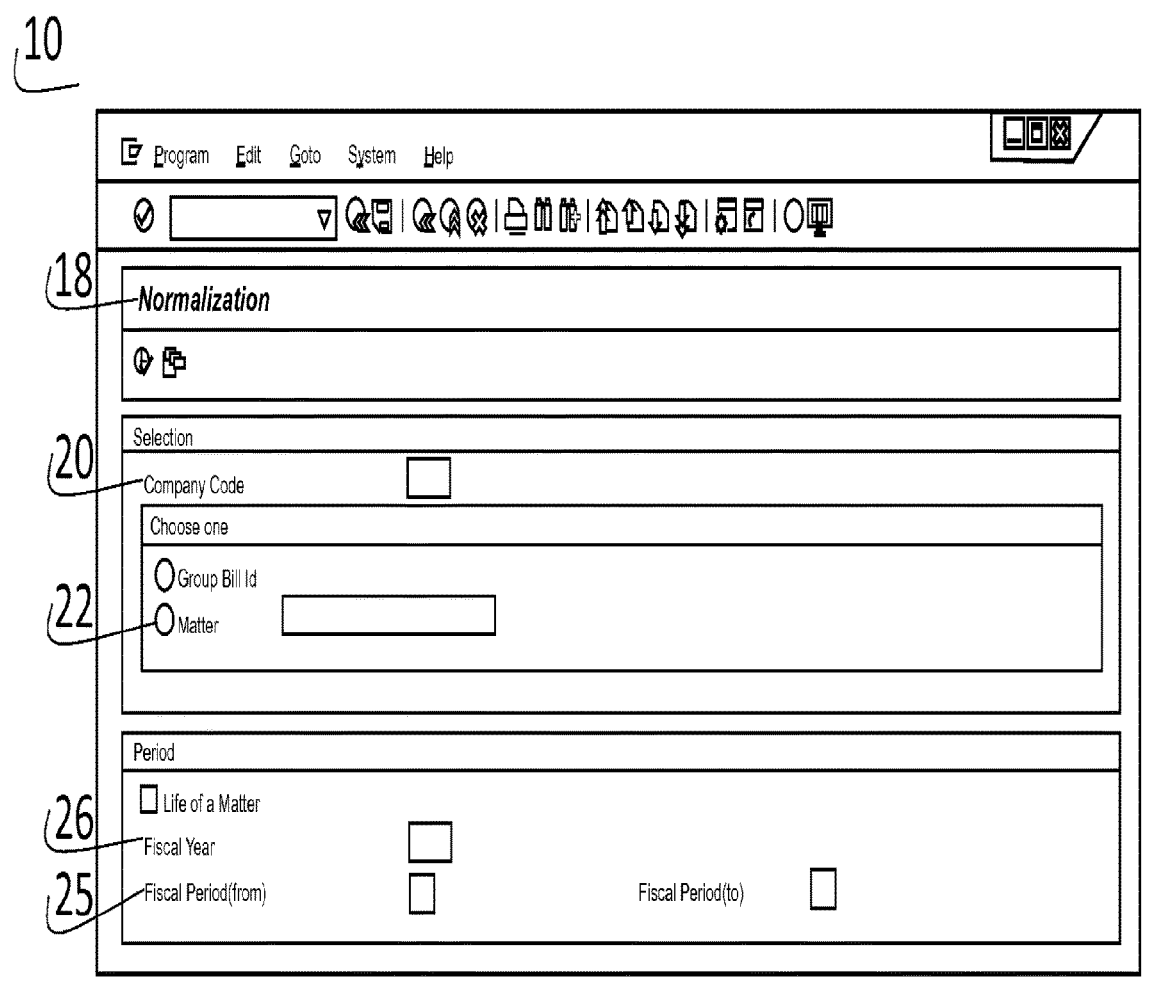
Figure 10:
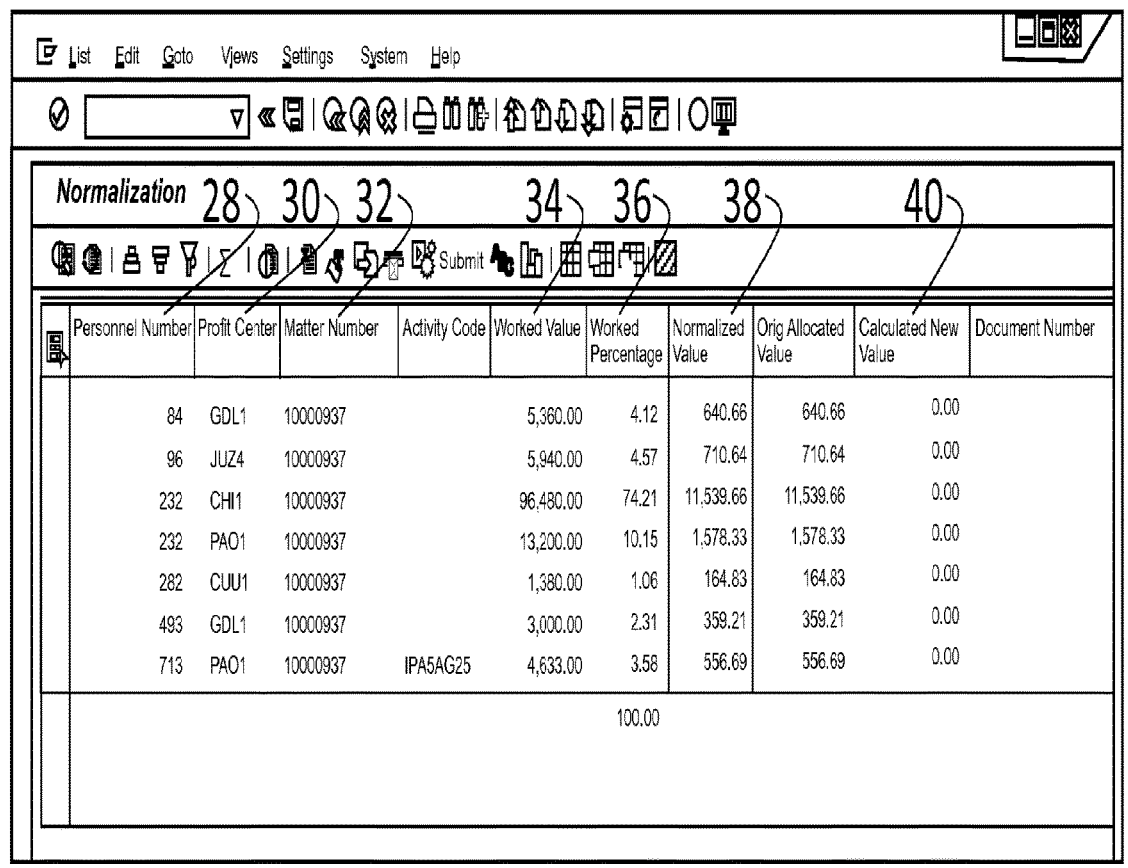
FIG. 10 is a screen shot of the present invention, Improved Client Normalization and Ranking System for Profit Sharing.

Shown now in FIG. 1 is a screen snapshot for the present invention, Improved Client Normalization or Leveraging System 10 which shows a header for the system "Normalization" 18. Company Code is shown in Field 20, the Matter Code is shown in Field 22 and the Fiscal Period is shown in Field 25 and the Fiscal Year is shown in Field 26.

Figure 2:
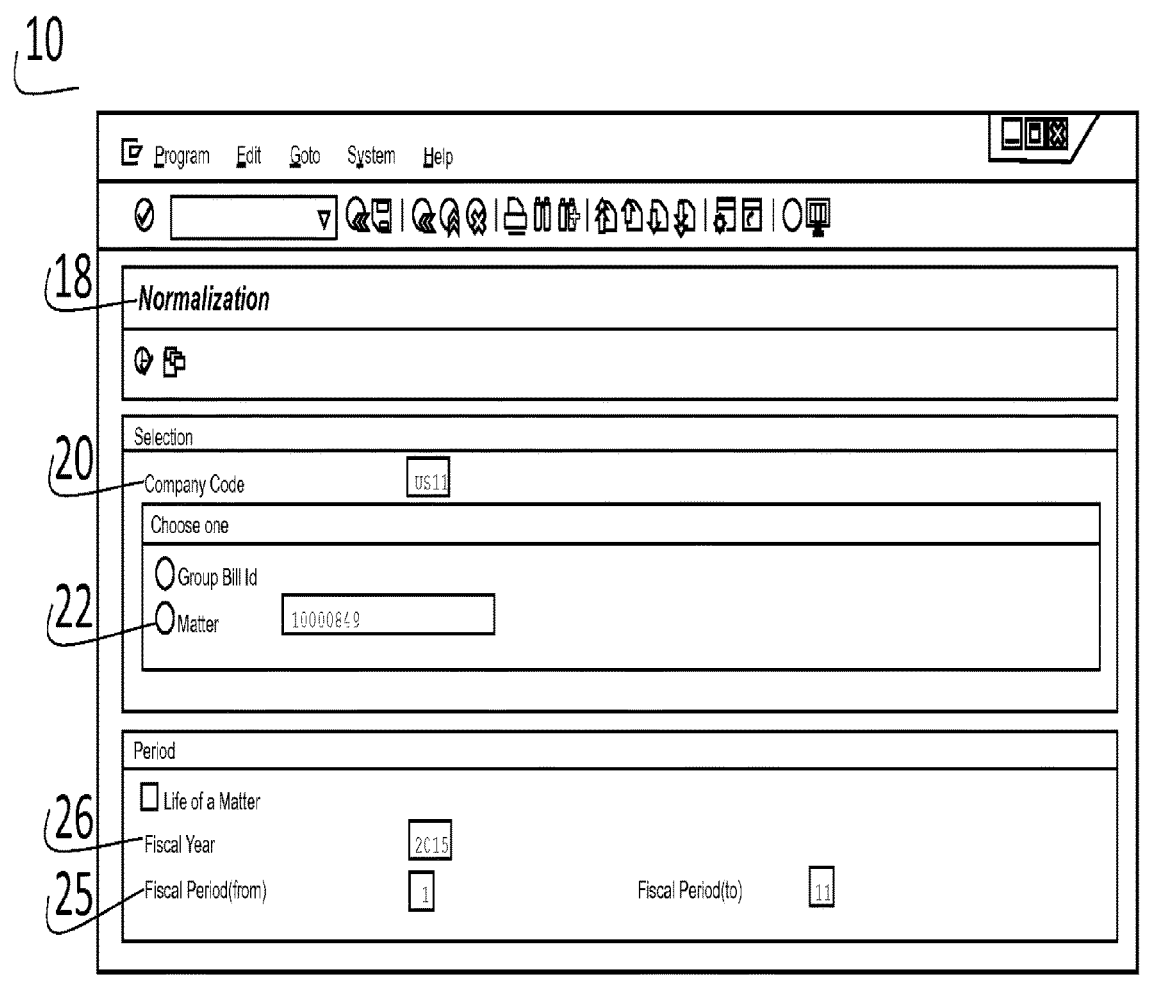

FIG. 2 also shows a screen snapshot for the present invention, Improved Client Normalization or Leveraging System 10 which shows the screen header 18. Also shown is a Company Code 20 and a Matter No. 22. The User has also specified data for Fiscal Year 2015 in Field 26 and a Fiscal Period 25. The user has also checked off the Year-to-Date Normalization box or YTD Field 22.

FIG. 3 shows a screen snapshot for the present invention, Improved Client Normalization or Leveraging System 10 which shows the work data which has been Normalized and assigned to the Profit Center Chicago in Field 30. Also shown are the Personnel Number 28, the Matter Number Field 32, the Worked Value 34, the Worked Percentage 36 and the Normalized Value Field 38. By choosing this screen, reviewing it and then clicking on the "execute" button, the Time is normalized and accrues properly to the relevant Timekeeper(s) and Client Originating Partners.

Figure 4:
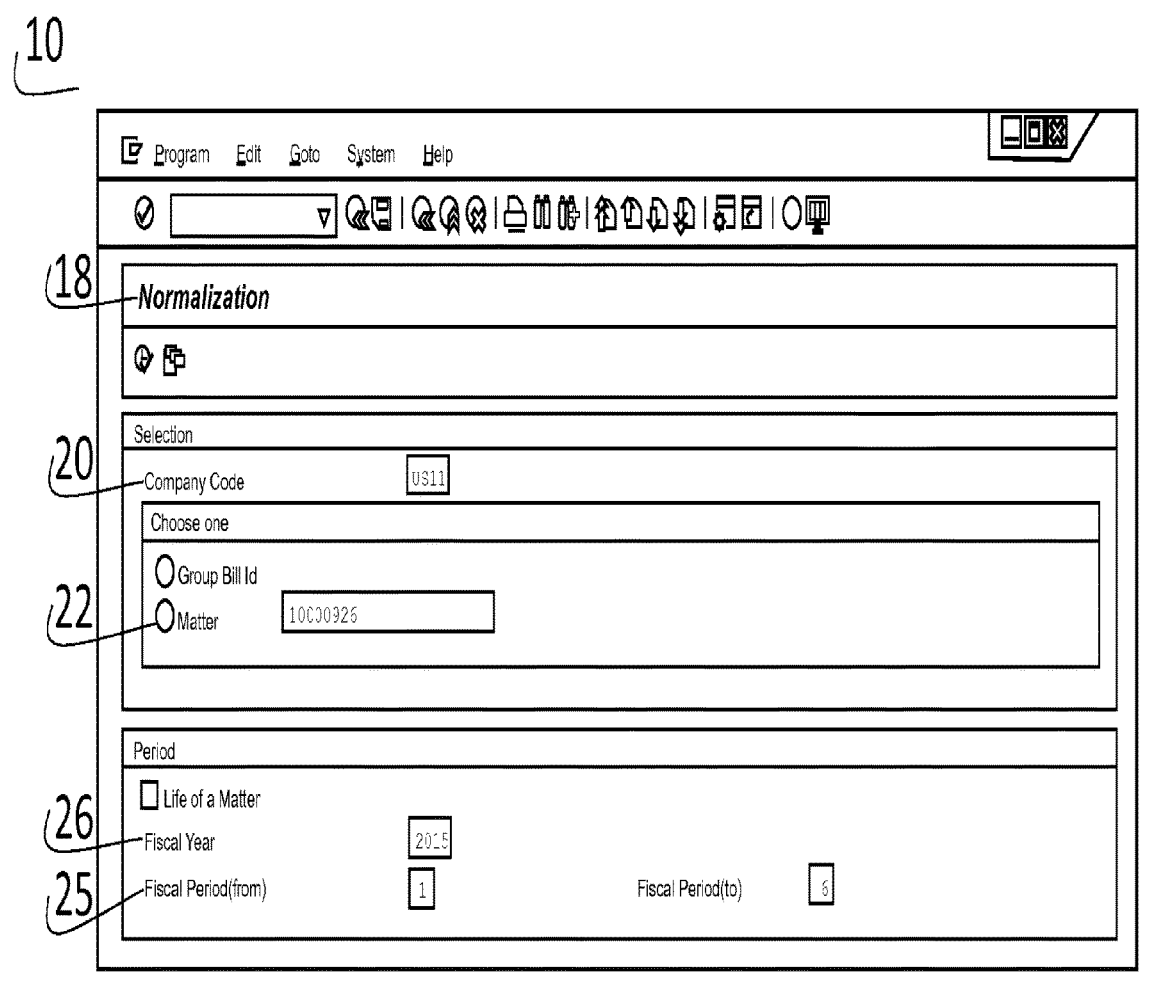

FIG. 4 shows a screen snapshot for the present invention, Improved Client Normalization or Leveraging System 10 which shows the Screen Header field 18 showing "Normalization", the Matter Number field 22, showing "10000926" and Fiscal Year Field 26 showing "2015". Once the user has selected the data or Time Entries to "Normalize", the user will then click the "execute" Icon in order to Normalize or calculate the weighted profits to be assigned to a Timekeeper or Client Originating Partner.

FIG. 5 shows a screen snapshot for the present invention, Improved Client Normalization or Leveraging System 10 which shows Personnel Number field 28, Profit Center field 30, Matter Number field 32, Worked Value field 34, Worked Percentage field 36 and Normalized Value field 38 and a New Value Calculation field 40 where the Value of the Time billed has been corrected by −1,000 for the first line item.

FIG. 6 a screen snapshot for the present invention, Improved Client Normalization or Leveraging System 10 which shows Personnel Number field 28, Profit Center field 30, Matter Number field 32, Worked Value field 34, Worked Percentage field 36 and New Value Calculation field 40 with a correction of −1,000 which will be processed when the submit icon is clicked.

FIG. 7 shows a screen snapshot for the present invention, Improved Client Normalization or Leveraging System 10 which shows Personnel Number field 28, Profit Center field 30, Matter Number field 32, Worked Value field 34, Worked Percentage field 36 and Normalized Value field 38 and a New Value Calculation field 40 where the Value of the Time billed has been corrected by −1,000 for the first line item. The execution of this function has created a new field, Document No. Field 42 which tracks the new normalized value for this time entry data.

Figure 8:
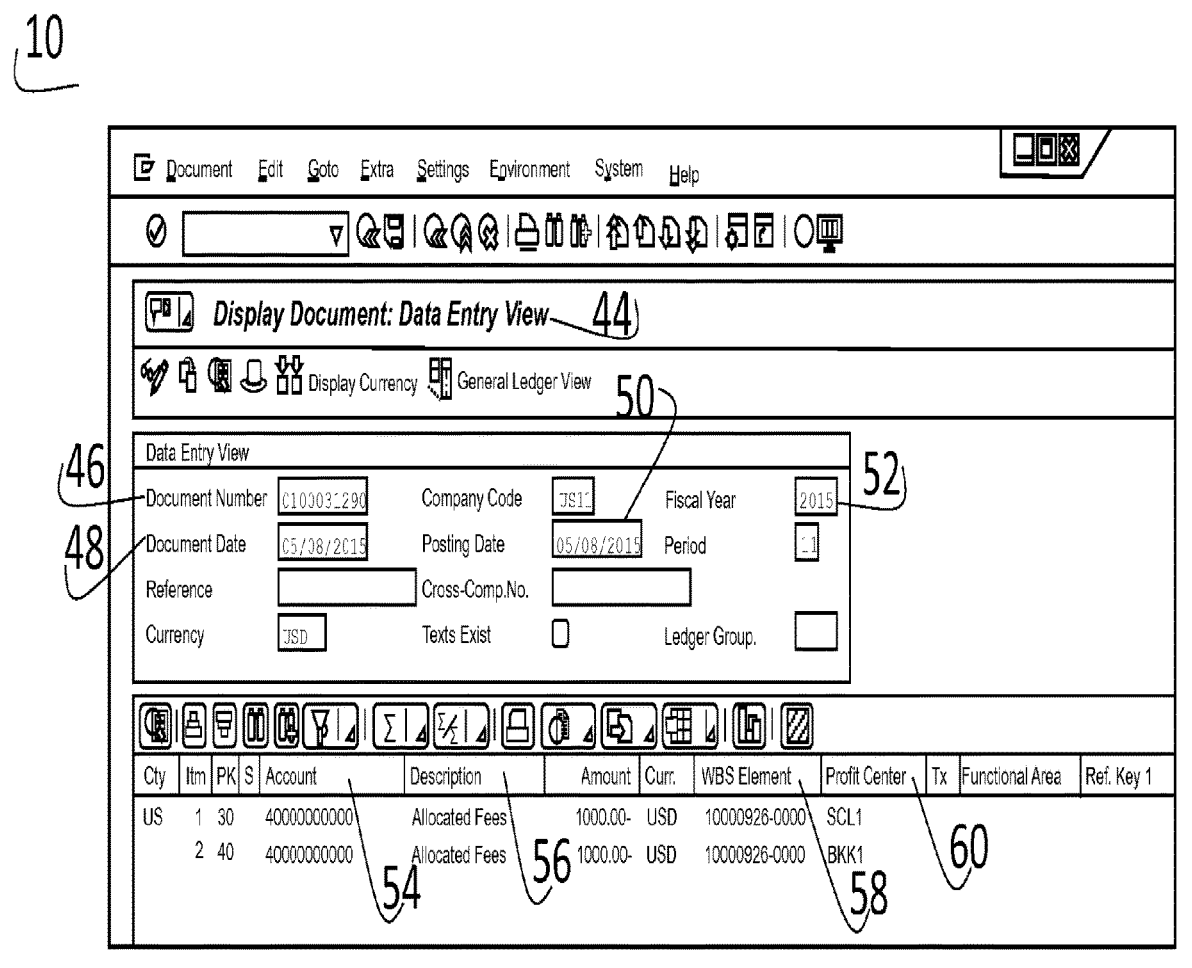

FIG. 8 shows a screen snapshot for the present invention, Improved Client Normalization or Leveraging System 10 which shows Display Document Data Entry View 44 for the new data document, showing Document Number field 46, Document Date 48 which is the date it was created, Posting Date field 50, fiscal Year field 52, Account No. Field 54, a Description field for the new Document 56, the WBS element assigned to the transaction field 58 and the Profit Center field 60 to which the transaction belongs.

FIG. 9 shows a screen snapshot for the present invention, Improved Client Normalization or Leveraging System 10 which contains the header 18 or Normalization. Company Code is shown in Field 20, the Matter Code is shown in Field 22, the Fiscal Period 25 and the Fiscal Year is shown in Field 26. In this particular instance, a Flat Fee Code of 71 as shown in Matter Category 24 has been assigned to the transaction.

FIG. 10 shows a screen snapshot for the present invention, Improved Client Normalization or Leveraging System 10 which contains Personnel Number field 28, Profit Center field 30, Matter Number field 32, Worked Value field 34, Worked Percentage field 36 and Normalized Value field 38 and a New Value Calculation field 40.

Figure 11:
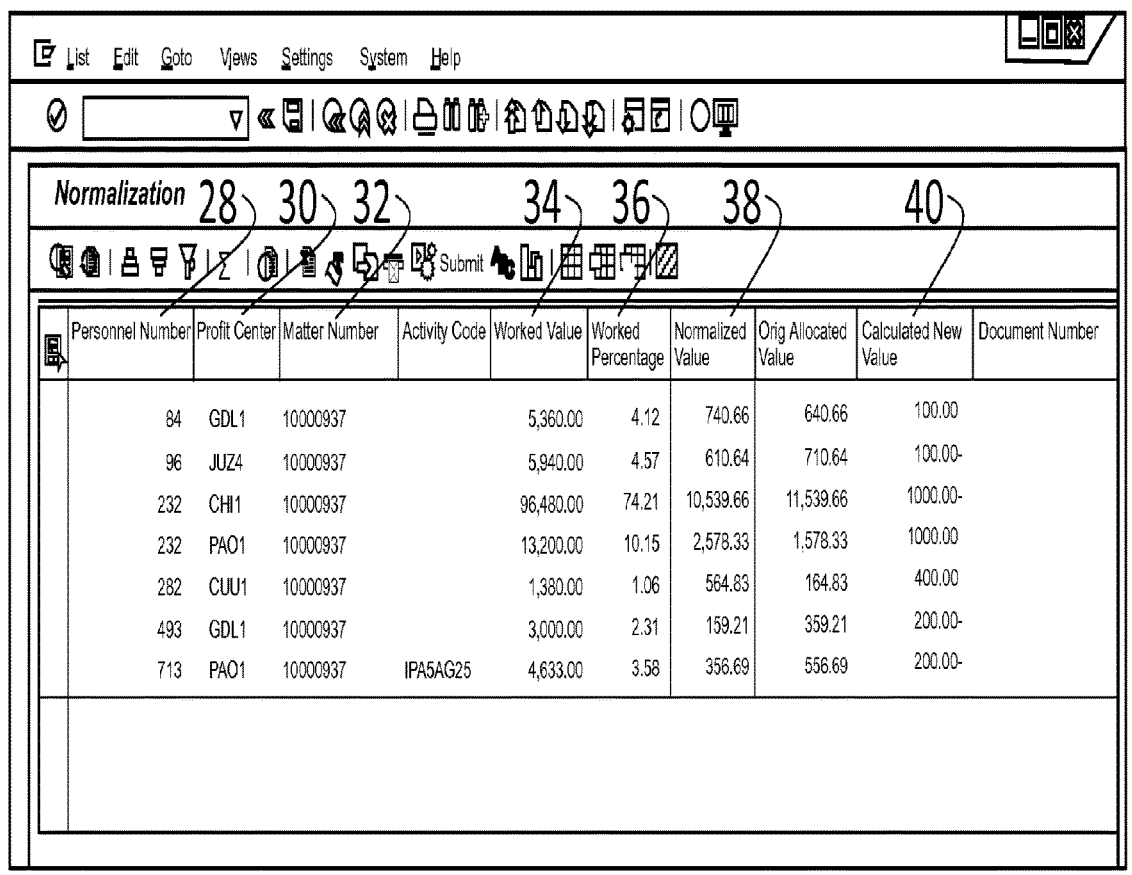
FIG. 11 is a screen shot of the present invention, Improved Client Normalization and Ranking System for Profit Sharing.

FIG. 11 shows a screen snapshot for the present invention, Improved Client Normalization or Leveraging System 10 which contains Personal Number field 28, Profit Center field 30, Matter Number field 32, Worked Value field 34, Worked Percentage field 36 and Normalized Value field 38 and a New Value Calculation field 40. This screen snapshot shows how the Normalized Value field 38 has been executed and the new leveraged billed amounts that it contains.

FIG. 12 shows a screen snapshot for the present invention, Improved Client Normalization or Leveraging System 10 which shows Personal Number field 28, Profit Center field 30, Matter Number field 32, Worked Value field 34, Worked Percentage field 36 and Normalized Value field 38 and a New Value Calculation field 40 where the Value of the Time billed has been corrected by +100.00 for the first line item. The execution of this function has created a new field, Document No. Field 42 which tracks the new normalized value for this new normalized leveraged billed amount.

FIG. 13 shows a screen snapshot for the present invention, Improved Client Normalization or Leveraging System 10 which shows Display Document Data Entry View 44 for the new data document, showing Document Number field 46, Document Date 48 which is the date it was created, Posting Date field 50, fiscal Year field 52, Account No. Field 54, a Description field for the new Document 56, the WBS element assigned to the transaction field 58 and the Profit Center field 60 to which the transaction belongs.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention.

What is claimed is:

1. A System comprising a CPU and data storage, wherein the CPU is operative to:
   receive a Billing Entity ID corresponding to a Billing Entity within a company;
   log time Billed and Time Collected by the Billing Entity for a client;
   automatically ping a third party website by sending a signal from the CPU to the third party website requesting information from the third party website regarding the stability of the client and retrieve from the third party website the information regarding the stability of the client;
   create a predetermined set of rules to calculate a Billing Entity Factor which is proportional to the time collected divided by the time billed by the Billing Entity, and adjust the Billing Entity Factor based on the information regarding the stability of the client; and
   determine profit allocation for the Billing Entity based on the adjusted Billing Entity Factor.

2. The System according to claim 1 wherein the CPU is further operative to:
   receive a ranking of all Billing Entities in the company; and
   utilizing the ranking of all Billing Entities to create the predetermined set of rules to calculate the Billing Entity Factor.

3. The System according to claim 1 wherein the CPU is further operative to:
   receive a listing for each company client, including the client, the average number of days each of the company clients was late in paying a bill and ranking each client accordingly; and
   utilize that information to create the predetermined set of rules to calculate the Billing Entity Factor.

4. The System according to claim 1 wherein the CPU is further operative to:
   receive a listing of all the funds past due for a given Billing Entity and rank that Billing Entity accordingly; and
   utilize that information to create the predetermined set of rules to calculate the Billing Entity Factor.

5. The System according to claim 1, wherein
   the third party website is one or more of the following internet billing ranking websites: Google, AVVO, Grub Hub, Yelp, Fortune 100 and Fortune 500.

6. The System according to claim 1 wherein the CPU is further operative to:
   receive a listing of demerits for the clients of each Billing Entity which negatively effects the Billing Entity Factor which is selected from one or more of the following adverse client actions: failure to attend court hearings when required; failure to appear for depositions as scheduled; failure to attend firm meetings as scheduled; and, failure to review, execute and return documents in a timely fashion; and
   utilize that information to create the predetermined set of rules to calculate the Billing Entity Factor.

7. The System according to claim 1 wherein the CPU is further operative to:
   receive a listing of demerits for the clients of each Billing Entity which negatively effects the Billing Entity Factor which is selected from one or more of the following adverse client actions: file groundless bar complaints or a malpractice suit; and
   utilize that information to create the predetermined set of rules to calculate the Billing Entity Factor.

8. The System according to claim 1 wherein the CPU is further operative to:
   receive a listing of Standard Industrial Codes for the clients of each Billing Entity which have been assigned a ranking by the company to encourage Billing Entities to select clients in favorable industries; and utilize that information to create the predetermined set of rules to calculate the Billing Entity Factor.

9. The System according to claim 1 wherein the CPU is further operative to:
receive a listing of Activities and Areas of Law and their ranking; and
utilize that information to create the predetermined set of rules to calculate the Billing Entity Factor.

10. The System according to claim 1 wherein the CPU is further operative to:
receive a listing of each Billing Entity's total billable hours and their ranking; and
utilize that information to create the predetermined set of rules to calculate the Billing Entity Factor.

11. A Method implemented by a computer comprising a CPU and data storage the method comprising:
receiving, by the CPU, a Billing Entity ID corresponding to a Billing Entity within a company;
logging, by the CPU, the time Billed and the Time Collected by the Billing Entity for a client;
automatically pinging a third party website by sending a signal from the CPU to the third party website requesting information from the third party website regarding the stability of the client and retrieving from the third party website the information regarding the stability of the client;
creating, by the CPU, a predetermined set of rules to calculate a Billing Entity Factor which is proportional to the time collected divided by the time billed by the Billing Entity, and adjusting the Billing Entity Factor based on the information regarding the stability of the client; and
determining, by the CPU, profit allocation for the Billing Entity based on the adjusted Billing Entity Factor.

12. The Method according to claim 11 further having the following steps:
receiving, by the CPU, a ranking of all Billing Entities in the company; and
utilizing, by the CPU, that information to create the predetermined set of rules to calculate the Billing Entity Factor.

13. The Method according to claim 11 further having the following steps:
receiving, by the CPU, a listing for each company client, including the client, the average number of days each of the company clients was late in paying a bill and ranking each client accordingly; and
utilizing, by the CPU, that information to create the predetermined set of rules to calculate the Billing Entity Factor.

14. The Method according to claim 11 further having the following steps:
receiving, by the CPU, a listing of all funds past due for a given Billing Entity and ranking that Billing Entity accordingly; and
utilizing, by the CPU, that information to create the predetermined set of rules to calculate the Billing Entity Factor.

15. The Method according to claim 11 further having the following steps:
retrieving from the third party website the information regarding the stability of the client includes receiving, by the CPU, a business ranking for the client of the Billing Entity which is collected from one or more of the following internet billing entity ranking websites: Google, AVVO, Grub Hub, Yelp, Fortune 100 and Fortune 500.

16. The Method according to claim 11 further having the following steps:
receiving, by the CPU, a listing of demerits for the clients of each Billing Entity which negatively effects the Billing Entity Factor which is selected from one or more of the following adverse client actions: failure to attend court hearings when required; failure to appear for depositions as scheduled; failure to attend firm meetings as scheduled; and, failure to review, execute and return documents in a timely fashion; and
utilizing, by the CPU, that information to create the predetermined set of rules to calculate the Billing Entity Factor.

17. The Method according to claim 11 further having the following steps:
receiving, by the CPU, a listing of demerits for the clients of each Billing Entity which negatively effects the Billing Entity Factor which is selected from one or more of the following adverse client actions: file groundless bar complaints or a malpractice suit; and
utilizing, by the CPU, that information to create the predetermined set of rules to calculate the Billing Entity Factor.

18. The Method according to claim 11 further having the following steps:
receiving, by the CPU, a listing of Standard Industrial Codes for the clients of each Billing Entity which have been assigned a ranking by the company to encourage Billing Entities to select clients in favorable industries; and
utilizing, by the CPU, that information to create the predetermined set of rules to calculate the Billing Entity Factor.

19. The Method according to claim 11 further having the following steps:
receiving, by the CPU, a listing of Activities and Areas of Law and their ranking; and
utilizing, by the CPU, that information to create the predetermined set of rules to calculate the Billing Entity Factor.

20. The Method according to claim 11 further having the following steps:
receiving, by the CPU, a listing of each billing Entity's total billable hours and their ranking; and
utilizing, by the CPU, that information to create the predetermined set of rules to calculate the Billing Entity Factor.

* * * * *